United States Patent
Kim et al.

(10) Patent No.: US 10,555,379 B2
(45) Date of Patent: Feb. 4, 2020

(54) HANGER-TYPE COOKING INFORMATION PROVIDING DEVICE

(71) Applicant: LG ELECTRONICS INC., Seoul (KR)

(72) Inventors: Wansoo Kim, Seoul (KR); Hyunwook Moon, Seoul (KR); Byungkyu Park, Seoul (KR); Yangkyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 15/471,217

(22) Filed: Mar. 28, 2017

(65) Prior Publication Data
US 2017/0280510 A1 Sep. 28, 2017

(30) Foreign Application Priority Data

Mar. 28, 2016 (KR) .................. 10-2016-0036665

(51) Int. Cl.
*A47J 27/62* (2006.01)
*H05B 6/06* (2006.01)
(Continued)

(52) U.S. Cl.
CPC .............. *H05B 6/062* (2013.01); *A47J 36/32* (2013.01); *H05B 6/1209* (2013.01)

(58) Field of Classification Search
CPC .......... A47J 36/12; A47J 36/14; A47J 36/165; A47J 36/2405; A47J 36/32; A47J 27/002;
(Continued)

(56) References Cited

U.S. PATENT DOCUMENTS

| 2,947,171 A * | 8/1960 | Peltola .................. G01K 13/04 |
| | | 219/458.1 |
| 2007/0210062 A1* | 9/2007 | Gaynor ................. A47J 27/004 |
| | | 219/442 |

(Continued)

FOREIGN PATENT DOCUMENTS

| CN | 102894891 | 1/2013 |
| DE | 3045143 | 7/1982 |

(Continued)

OTHER PUBLICATIONS

Extended European Search Report in European Application No. 17163049.4, dated Aug. 14, 2017, 7 pages (with English translation).

*Primary Examiner* — Hung D Nguyen
(74) *Attorney, Agent, or Firm* — Fish & Richardson P.C.

(57) ABSTRACT

A hanger-type cooking information providing device is disclosed. The hanger-type cooking information providing device includes a clip portion including a water level sensor and configured to be hung on a cooking container, a contact portion including a temperature sensor configured to contact one lateral surface of the cooking container and to measure temperature, and a main body portion including a wireless communication module configured to wirelessly transmit, to an external device, at least one of water level information sensed by the water level sensor, temperature information sensed by the temperature sensor, water boiling notification information, information on elapsed cooking time, and information on remaining cooking time.

19 Claims, 11 Drawing Sheets

(51) Int. Cl.
*A47J 36/32* (2006.01)
*H05B 6/12* (2006.01)

(58) Field of Classification Search
CPC ........ A47J 27/004; A47J 27/10; A47J 27/212; A47J 27/62; H05B 6/062; H05B 6/1209; H05B 6/1263; H05B 6/1272
USPC .............. 219/446.1, 448.11, 448.12, 448.14, 219/448.15, 448.16, 448.18, 621, 627, 219/667, 410, 712, 713; 99/331, 453, 99/DIG. 10; 374/3, 100, 116, 124
See application file for complete search history.

(56) References Cited

U.S. PATENT DOCUMENTS

| | | | | |
|---|---|---|---|---|
| 2008/0083730 | A1* | 4/2008 | Dolgov | A47J 27/004 219/432 |
| 2011/0018725 | A1* | 1/2011 | Yang | G01N 33/02 340/627 |
| 2015/0342392 | A1* | 12/2015 | Wu | A47J 27/10 99/331 |
| 2017/0138797 | A1* | 5/2017 | Brown | G01K 1/14 |

FOREIGN PATENT DOCUMENTS

| | | |
|---|---|---|
| DE | 20318327 | 4/2005 |
| GB | 2301469 | 12/1996 |

\* cited by examiner

US 10,555,379 B2

HANGER-TYPE COOKING INFORMATION PROVIDING DEVICE

CROSS-REFERENCE TO RELATED APPLICATION

This application claims the priority benefit of Korean Patent Application No. 10-2016-0036665, filed on Mar. 28, 2016 in the Korean Intellectual Property Office, the disclosure of which is incorporated herein by reference.

BACKGROUND OF THE INVENTION

1. Field of the Invention

The present invention relates to a hanger-type cooking information providing device, and more particularly to a hanger-type cooking information providing device that is detachably placed on a cooking container for cooking food, acquiring various cooking information items, and providing the information to a user.

2. Description of the Related Art

When food is heated and cooked using cooking equipment such as a burner or a gas range, a cooking container such as a pot or a frying pan is used.

In general, a cooking target food is placed in a cooking container and, then, is heated by heating cooking equipment to cook the food contained in the cooking container. In general, there is no component for detecting a heating state in a cooking container and, thus, a user cooks food while guessing a current heating state of the food directly with his or her eyes during cooking.

As such, it is not easy and accurate to check a heating state of food with the eye and to determine a level of the heating state.

A cook has inconvenience of frequently checking a heating state of food or of having difficulty in performing another operation until cooking is finished.

In order to overcome such inconvenience, research has been increasingly conducted into a method of measuring temperatures of a cooking container and a cooking target and providing information.

A method of attaching a temperature sensor to a cooking container has been proposed, but a temperature sensor needs to be attached for each separate cooking container, resulting in high cost burden.

In addition, it is possible to measure temperature only at a fixed specific location and, thus, there is a problem in that a current temperature is not accurately measured.

SUMMARY OF THE INVENTION

Therefore, the present invention has been made in view of the above problems, and it is an object of the present invention to provide a hanger-type cooking information providing device for measuring temperatures of a cooking container and a cooking target and providing temperature information.

It is another object of the present invention to provide a hanger-type cooking information providing device for enhancing accuracy for measuring temperature of a cooking target.

It is another object of the present invention to provide a hanger-type cooking information providing device for various cooking information items such as water level information, salinity information, and time information.

It is another object of the present invention to provide a hanger-type cooking information providing device that is conveniently used and managed.

It is another object of the present invention to provide a hanger-type cooking information providing device that is operated in conjunction with cooking equipment based on the acquired cooking information.

In accordance with an aspect of the present invention, the above and other objects can be accomplished by the provision of a hanger-type cooking information providing device including a clip portion including a water level sensor and configured to be hung on a cooking container, a contact portion including a temperature sensor configured to contact one lateral surface of the cooking container and to measure temperature, and a main body portion including a wireless communication module configured to wirelessly transmit, to an external device, at least one of water level information sensed by the water level sensor, temperature information sensed by the temperature sensor, water boiling notification information, information on elapsed cooking time, and information on remaining cooking time.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
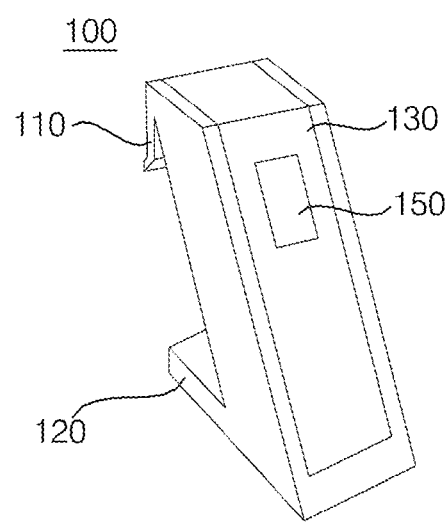
FIGS. 1 and 2 are diagrams illustrating an outer appearance of a hanger-type cooking information providing device according to an exemplary embodiment of the present invention.

Exemplary embodiments of the present invention will be described with reference to the attached drawings. The invention may, however, be embodied in many different forms and should not be construed as being limited to the embodiments set forth herein.

In the drawings, for convenience and clarity of illustration, portions unrelated to description are omitted and, throughout this specification, the same reference numerals indicate the same or similar elements.

In addition, the suffixes "module" and "unit" of elements herein are used for convenience of description and do not have any distinguishable meanings or functions. Accordingly, "module" and "unit" can be used interchangeably.

Figure 2:
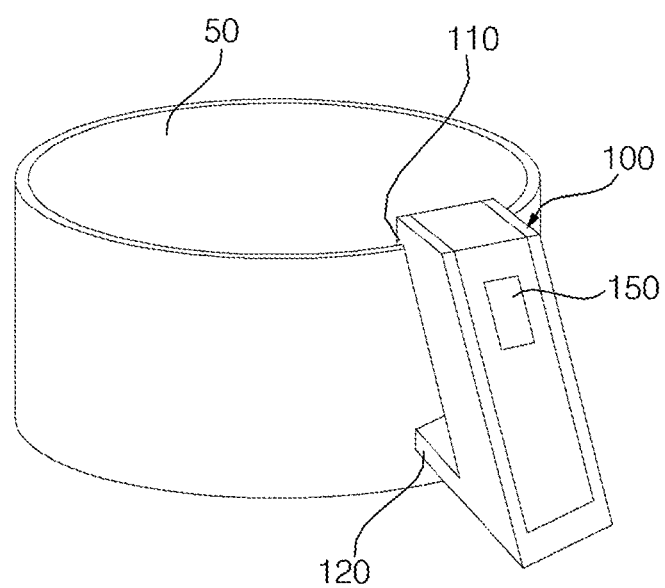

FIGS. 1 and 2 are diagrams illustrating an outer appearance of a hanger-type cooking information providing device 100 according to an exemplary embodiment of the present invention.

In more detail, FIG. 1 illustrates an example in which the hanger-type cooking information providing device 100 is suspended over a flat surface and FIG. 2 illustrates an example in which the hanger-type cooking information providing device 100 is suspended by a cooking container 50.

Figure 3:
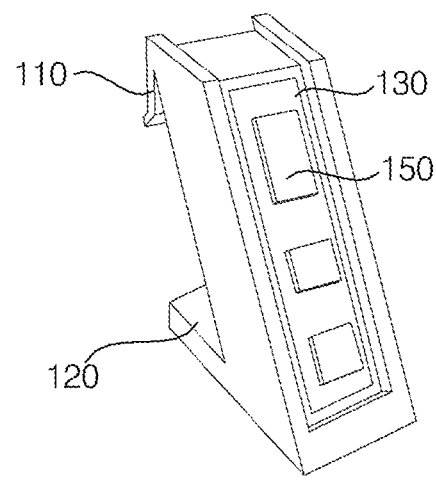
FIG. 3 is a diagram illustrating an internal portion of a hanger-type cooking information providing device according to an exemplary embodiment of the present invention.

FIG. 3 is a diagram illustrating an internal portion of the hanger-type cooking information providing device 100 according to an exemplary embodiment of the present invention.

Referring to FIGS. 1 to 3, the hanger-type cooking information providing device 100 according to an exemplary embodiment of the present invention may include a water sensor and a clip portion 110 that is hung on the cooking container 50, a contact portion 120 including a temperature sensor that contacts one lateral surface of the cooking container 50 and measures temperature, and a main body portion 130 including a wireless communication module for wirelessly transmitting, to an external device, cooking information based on water level information sensed by the water level sensor and temperature information sensed by the temperature sensor.

The cooking information provided by a cooking information providing device according to an exemplary embodiment of the present invention may include primary information obtained from a temperature sensor, a water level sensor, and a salinity sensor and time information and secondary information calculated or obtained from the primary information.

For example, the cooking information may include at least one of water level information sensed by the water level sensor, temperature information sensed by the temperature sensor, water boiling notification information, information on elapsed cooking time, and information on remaining cooking time.

Accordingly, the wireless communication module may transmit at least one of water level information sensed by the water level sensor, temperature information sensed by the temperature sensor, water boiling notification information, information on elapsed cooking time, and information on remaining cooking time.

The hanger-type cooking information providing device 100 according to an exemplary embodiment of the present invention may be suspended by the cooking container 50 such as a pot using the clip portion 110. A user may suspend the hanger-type cooking information providing device 100 at a desired location of the cooking container 50 to allow the hanger-type cooking information providing device 100 to contact the cooking container 50.

A temperature sensor may be disposed at one end of the contact portion 120 and may be closely positioned on the cooking container 50 to sense temperature.

The clip portion 110 may partially protrude and extend toward an internal side of the cooking container 50. A water level sensor for detecting a water level may be disposed at the clip portion 110 that partially protrudes and extends toward the internal side of the cooking container 50. For example, the water level sensor may detect current that flows through two metallic tips to detect a water level.

In order to easily suspend the hanger-type cooking information providing device 100 over the cooking container 50, an end of the clip portion 110 may be bent outwards based on the hanger-type cooking information providing device 100.

The clip portion 110 may further include an additional sensor such as a salinity sensor.

The hanger-type cooking information providing device 100 according to an exemplary embodiment of the present invention may be advantageously used irrespective of a shape of the cooking container 50 such as information on whether the cooking container 50 has a handle.

As illustrated in FIG. 1, the hanger-type cooking information providing device 100 may be suspended alone over a flat surface when not in use and may be easily stored and managed.

The hanger-type cooking information providing device 100 according to an exemplary embodiment of the present invention may include a display 150 for display cooking information based on the water level information sensed by the water level sensor and the temperature information sensed by the temperature sensor.

Figure 4:
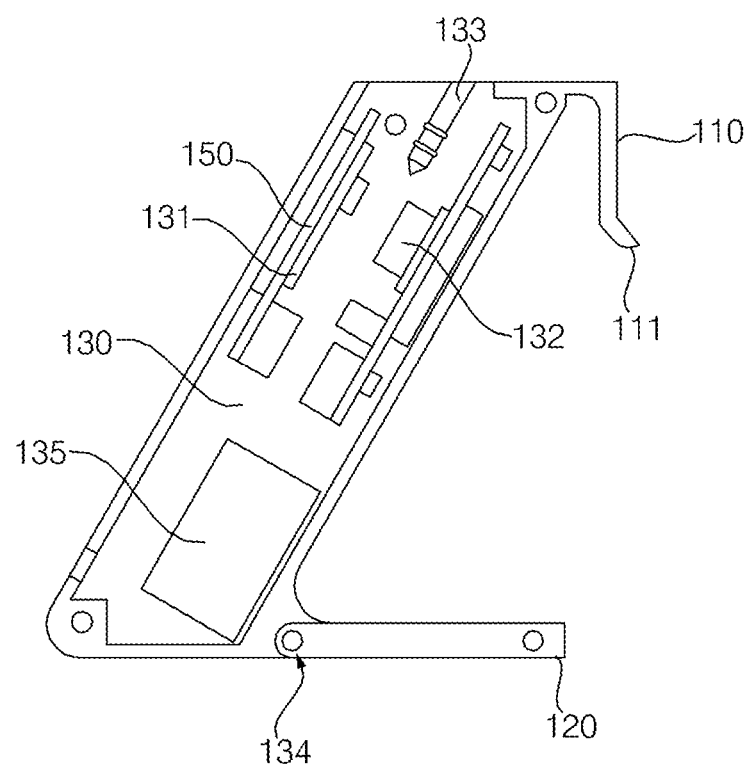
FIG. 4 is an internal cross-sectional view of a hanger-type cooking information providing device according to an exemplary embodiment of the present invention.

FIG. 4 is an internal cross-sectional view of the hanger-type cooking information providing device 100 according to an exemplary embodiment of the present invention.

Referring to FIG. 4, the hanger-type cooking information providing device 100 according to an exemplary embodiment of the present invention may include the clip portion 110 including a water level sensor and may be hung on the cooking container 50, the contact portion 120 that comes in contact with one lateral surface of the cooking container 50 to measure temperature, and the main body portion 130 including a wireless communication module 132 for wirelessly transmitting, to an external device, cooking information based on the water level information sensed by the water level sensor and the temperature information sensed by the temperature sensor.

The main body portion 130 may further include a processor 131 for generating secondary information including at least one of water boiling notification information, information on elapsed cooking time, and information on remaining cooking time based on primary data sensed by the water level sensor and the temperature sensor.

In some embodiments, the processor 131 may generate time information including at least one of cooking start time, elapsed cooking time, and current time.

The hanger-type cooking information providing device 100 according to an exemplary embodiment of the present invention may further include a separate timer.

The processor 131 may control an overall operation of the hanger-type cooking information providing device 100.

The hanger-type cooking information providing device 100 according to an exemplary embodiment of the present invention may provide directly acquired primary data as primary information, such as the water level information sensed by the water level sensor and the temperature information sensed by the temperature sensor, to a user.

In addition, the hanger-type cooking information providing device 100 according to an exemplary embodiment of the present invention may generate secondary information such as water boiling notification information, information on elapsed cooking time, and information on remaining cooking time based on the primary data and may provide the secondary information to the user.

The secondary information may be generated based on the primary data and the time.

That is, the hanger-type cooking information providing device 100 according to an exemplary embodiment of the present invention may process collected primary data to generate secondary information and provide the secondary information to the user.

The hanger-type cooking information providing device 100 according to an exemplary embodiment of the present invention may provide both the primary and secondary information to the user.

The wireless communication module 132 may wirelessly transmit cooking information based on the water level information sensed by the water level sensor and the temperature information sensed by the temperature sensor, to an external device, for example, a portable terminal of a user and communicable cooking equipment.

That is, the hanger-type cooking information providing device 100 according to an exemplary embodiment of the present invention may provide the first and secondary information to a predetermined electronic device and provide the first and secondary information to the user.

The wireless communication module 132 may transmit a control signal that allows preset cooking equipment to perform a predetermined operation based on the cooking information, to the preset cooking equipment.

For example, the wireless communication module 132 may transmit a control signal for increasing heating intensity to cooking equipment including a heater such that temperature is increased to a preset temperature.

The hanger-type cooking information providing device 100 according to an exemplary embodiment of the present invention may display the primary and secondary information on the display 150 and provide the primary and secondary information to the user.

The cooking information based on the water level information sensed by the water level sensor and the temperature information sensed by the temperature sensor may be displayed on the display 150.

The processor 131 may control the display 150 to display the primary and/or secondary information.

The processor 131 may control the display 150 to display notification information when the water level information sensed by the water level sensor and the temperature information sensed by the temperature sensor satisfy a preset condition.

The hanger-type cooking information providing device 100 according to an exemplary embodiment of the present invention may further include an audio outputting unit for outputting an alarm when the water level information sensed by the water level sensor and the temperature information sensed by the temperature sensor satisfy a preset condition.

In order to easily suspend the hanger-type cooking information providing device 100 over the cooking container 50, an end 111 of the clip portion 110 may be bent outwards based on the hanger-type cooking information providing device 100.

The hanger-type cooking information providing device 100 according to an exemplary embodiment of the present invention may further include a temperature reading probe that is inserted into a cooking target to sense an internal temperature thereof.

In this case, the main body portion 130 may include a probe jack 133 into which the temperature reading probe is inserted for connection.

The temperature reading probe will be described below with reference to FIGS. 10 and 12.

The main body portion 130 may further include a hinge 134 for adjusting an angle of the contact portion 120 at a lower end of the main body portion 130. The main body portion 130 and the contact portion 120 may be hinged and rotated. The user may rotate the contact portion 120 to be closely placed to the cooking container.

In order to closely place the contact portion 120 to the cooking container, an end of the contact portion 120 may include a magnet. In more detail, a temperature sensor may be disposed at the end of the contact portion 120 and a magnet may be disposed around the temperature sensor. The temperature sensor may be covered by a metallic cover with high thermal conductivity. One or more magnets may be disposed around the metallic cover.

A battery 135 for supplying power required to drive the hanger-type cooking information providing device 100 may be disposed in the main body portion 130.

The internal portion of the main body portion 130 illustrated in FIG. 4 is merely exemplary and the present invention is not limited thereto. For example, the arrangement, sizes, shapes, and so on of the processor 131, the wireless communication module 132, the battery 135, and so on may be changed according to a design condition.

Figure 5:
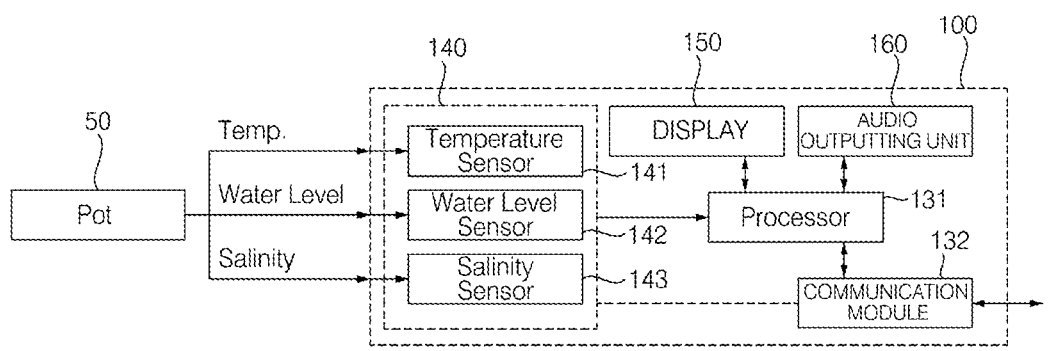
FIG. 5 is an internal block diagram of a hanger-type cooking information providing device according to an exemplary embodiment of the present invention.

FIG. 5 is an internal block diagram of the hanger-type cooking information providing device 100 according to an exemplary embodiment of the present invention. Referring to FIG. 5, the hanger-type cooking information providing device 100 according to an exemplary embodiment of the present invention will be described in terms of the function thereof.

The hanger-type cooking information providing device 100 according to an exemplary embodiment of the present invention may include a sensor unit 140, the processor 131, and the wireless communication module 132.

The sensor unit 140 may include one or more sensors 141, 142, and 143 for sensing and acquiring cooking information during cooking.

For example, the sensor unit 140 may include a temperature sensor 141 for sensing the cooking container 50 or temperature information on the cooking container 50, a water level sensor 142 for sensing water level information, a salinity sensor 143 for sensing salinity information, and so on.

Each of the sensors 141, 142, and 143 of the sensor unit 140 may be disposed at a location appropriate to acquire data.

For example, as described above, the water level sensor 142 and the salinity sensor 143 may be disposed in the clip portion 110 (refer to FIGS. 1 to 4) and the temperature sensor 141 may be disposed in the contact portion 120 (refer to FIGS. 1 to 4).

The processor 131 may control an overall operation of the hanger-type cooking information providing device 100.

The processor 131 may generate secondary information including at least one of water boiling notification information, information on elapsed cooking time, and information on remaining cooking time based on primary data sensed by each of the sensors 141, 142, and 143 of the sensor unit 140.

In some embodiments, the processor 131 may generate time information including at least one of cooking start time, elapsed cooking time, and current time.

The hanger-type cooking information providing device 100 according to an exemplary embodiment of the present invention may further include a separate timer for generating time information.

The processor 131 may generate secondary information based on the time information and primary data sensed by each of the sensors 141, 142, and 143.

The hanger-type cooking information providing device 100 according to an exemplary embodiment of the present invention may include the display 150 for outputting cooking information and/or an alarm.

The display 150 may display cooking information based on at least one of water level information sensed by the water level sensor 142, temperature information sensed by the temperature sensor 141, and salinity information sensed by the salinity sensor 143.

When data sensed by the sensor unit 140 satisfies a predetermined reference, the display 150 may display notification information thereon.

For example, the display 150 may display notification information when water level information sensed by the water level sensor 142 reaches a preset water level or is outside a preset water level range or when temperature information sensed by the temperature sensor 141 reaches a preset temperature or is outside a preset temperature range.

The display 150 may be embodied as a touchscreen used as an input unit as well as an output unit. The user may touch the display 150 to input a command of setting a desired temperature.

The display 150 may include a separate manipulator or input a user command using a portable terminal of the user.

The hanger-type cooking information providing device 100 may further include an audio output unit 160 such as a speaker.

When data sensed by the sensor unit 140 satisfies a predetermined reference, the audio output unit 160 may output a corresponding alarm. That is, audio such as an ending sound or a warning sound may be output according to a current situation and so on.

For example, the audio output unit 160 may transmit a warning sound when water level information sensed by the water level sensor 142 reaches a preset water level or is outside a preset water level range or when temperature sensed by the temperature sensor 141 reaches a preset temperature or is outside a preset temperature range.

The processor 131 may control the wireless communication module 132 to transmit cooking information to an external electronic device.

Figure 6:
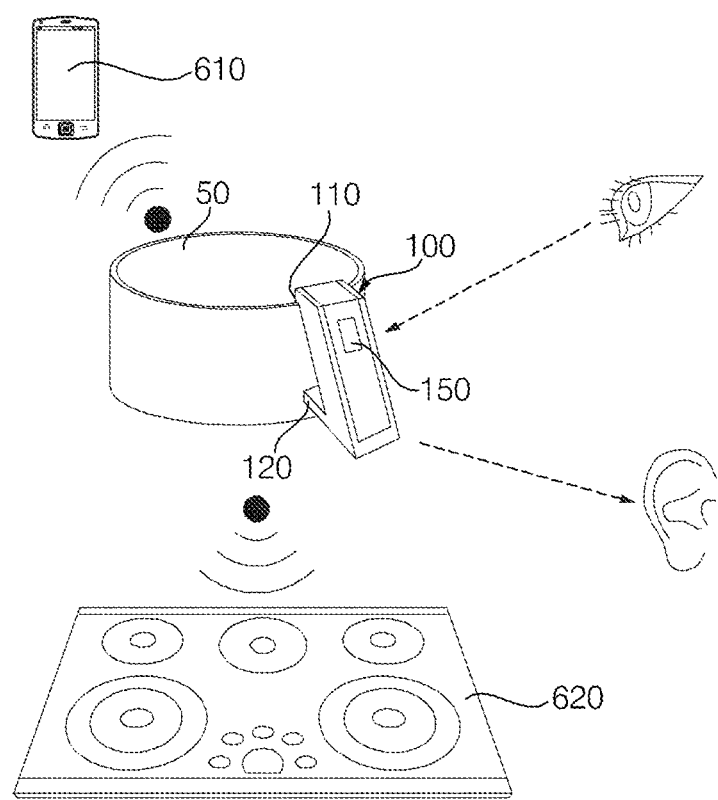
FIG. 6 is a diagram for explanation of provision of cooking information of a hanger-type cooking information providing device according to an exemplary embodiment of the present invention.

FIG. 6 is a diagram for explanation of provision of cooking information of a hanger-type cooking information providing device according to an exemplary embodiment of the present invention.

Referring to FIGS. 5 and 6, the wireless communication module 132 may transmit the cooking information to a preset portable terminal 610.

When data sensed by the sensor unit 140 satisfies a predetermined reference, the wireless communication module 132 may transmit notification information to the preset portable terminal 610.

The wireless communication module 132 may transmit the cooking information to preset cooking equipment 620.

The wireless communication module 132 may transmit a control signal that allows preset cooking equipment to perform a predetermined operation based on the cooking information, to the preset cooking equipment 620.

For example, in the case in which the preset cooking equipment 620 is induction heating cooking equipment, when temperature sensed by the temperature sensor 141 reaches a preset temperature, the wireless communication module 132 may transmit a control signal for powering off the induction heating cooking equipment 620 or lowering heating intensity to the induction heating cooking equipment 620.

When temperature sensed by the temperature sensor 141 reaches a preset temperature, the wireless communication module 132 may transmit a control signal for performing a temperature maintenance function to the induction heating cooking equipment 620.

Cooking information may be displayed through the display 150 and visual and audible information may be provided to a user through the display 150 and the audio output unit 160.

A hanger-type cooking information providing device according to the present invention may provide primary information obtained from a temperature sensor, a water level sensor, and a salinity sensor and time information and may also provide secondary information such as a boiling alarm and elapsed time of boiling through a combination of the corresponding information items.

That is, through this specification, the cooking information may include the primary information obtained from the temperature sensor, the water level sensor, and the salinity sensor and the time information and the secondary information calculated or obtained by the primary information. For example, the cooking information may include at least one of water level information sensed by the water level sensor, temperature information sensed by the temperature sensor, water boiling notification information, information on elapsed cooking time, and information on remaining cooking time.

The hanger-type cooking information providing device according to the present invention may perform a function of preventing water overflow, temperature maintenance, and so on through feedback control with cooking equipment such as a cooktop.

That is, the hanger-type cooking information providing device according to the present invention may acquire information on the contents of a cooking container through the temperature, salinity, and water level sensors and combine the temperature information, the salinity information, the water level information, and the time information to provide primary and secondary information (temperature, salinity, notification and elapses time of water boiling, water overflow detection, salinity change, timer, and so on).

The hanger-type cooking information providing device according to the present invention may adjust power of a burner in conjunction with cooking equipment such as a cooktop such that a current temperature reaches a preset temperature and is maintained. Accordingly, it may be possible to control temperature and a water level of the cooking container.

Figure 7:
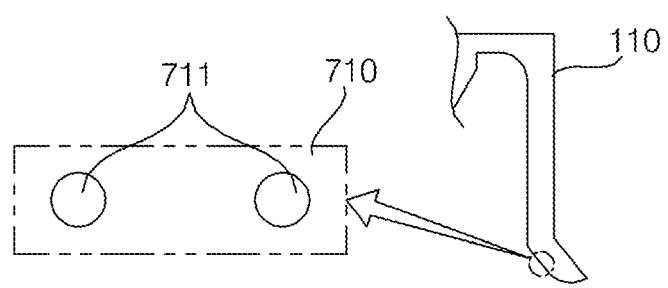
FIGS. 7 and 8 are diagrams for explanation of acquisition of cooking information of a hanger-type cooking information providing device according to an exemplary embodiment of the present invention.
Figure 8:
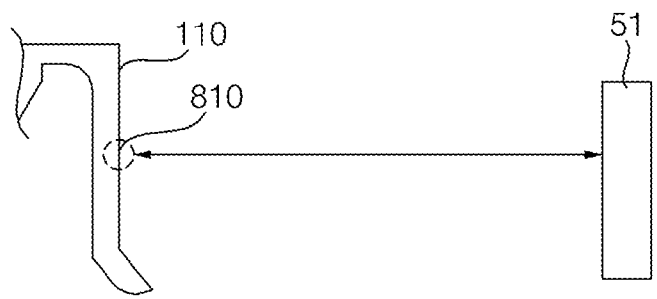

FIGS. 7 and 8 are diagrams for explanation of acquisition of cooking information of a hanger-type cooking information providing device according to an exemplary embodiment of the present invention.

Referring to FIGS. 7 and 8, In order to easily suspend the hanger-type cooking information providing device 100 over the cooking container, an end of the clip portion 110 may be bent outwards based on the hanger-type cooking information providing device 100.

The clip portion 110 may further include a sensing unit such as a water level sensor or a salinity sensor.

Referring to FIG. 7, a water level sensor 710 may detect current flowing through two metallic tips 711 to detect a water level.

When a water level reaches a preset water level, the water level sensor 710 may detect this.

As current detected by the water level sensor 710 is increased, a water level may be determined to be high.

In the case of a salinity sensor, it may be possible to calculate an area, interval, and temperature of the metallic tips 711.

The clip portion 110 may further include a distance sensor 810.

In this case, the processor may generate secondary temperature information based on a distance from one surface of the cooking container detected by the distance sensor 810 and temperature information sensed by the temperature sensor.

Referring to FIG. 8, the distance sensor 810 may be disposed outside the clip portion 110. In some embodiments, the distance sensor 810 may be an infrared sensor.

The distance sensor 810 may sense a distance from an opposite surface 51 to one lateral surface, which contacts the clip portion 110 of the cooking container. Accordingly, an entire size of the cooking container may be calculated.

The calculated size of the cooking container and the temperature information sensed by the temperature sensor may be combined and used to calculate temperature of the cooking container.

FIG. 9 is an internal cross-sectional view of a hanger-type cooking information providing device according to an exemplary embodiment of the present invention.

Figures 9A, 9B:
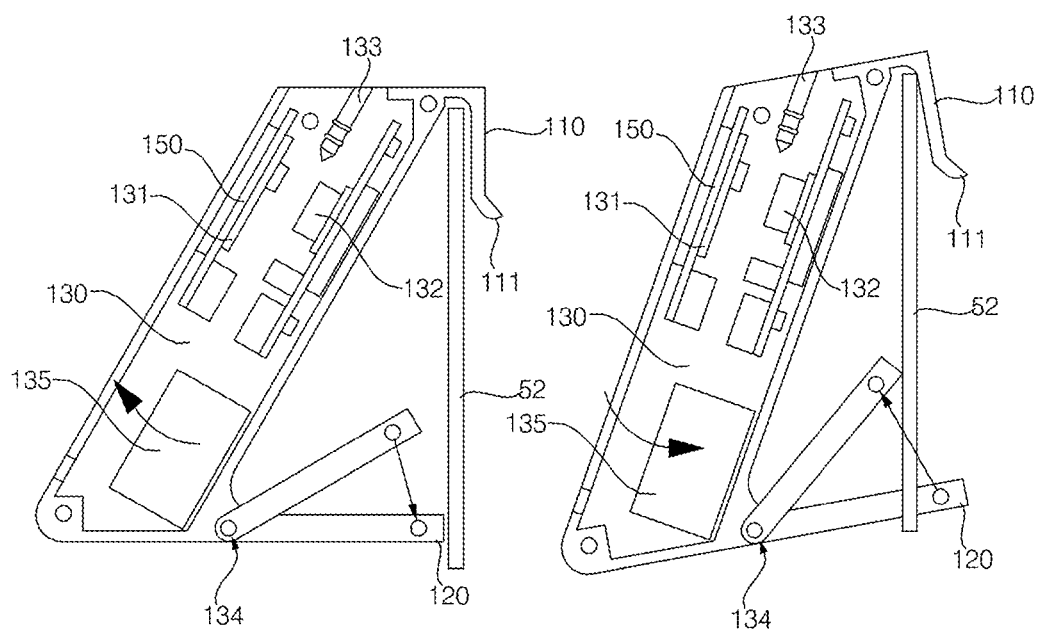
FIG. 9 is an internal cross-sectional view of a hanger-type cooking information providing device according to an exemplary embodiment of the present invention.

Referring to FIGS. 9A and 9B, the main body portion 130 may further include a hinge 134 for adjusting an angle of the contact portion 120 at a lower end of the main body portion 130. The main body portion 130 and the contact portion 120 may be hinged and rotated. A user may rotate the contact portion 120 to be closely placed to one lateral surface 52 of the cooking container.

FIGS. 9A and 9B illustrate examples in which the contact portion 120 comes in contact with the lateral surface 52 of the cooking container using the hinge 134 according to a configuration in which the lateral surface 52 of the cooking container is hung by the clip portion 110.

In order to allow the contact portion 120 to be placed close to the cooking container, an end of the contact portion 120 may include a magnet. In detail, a temperature sensor may be disposed at one end of the contact portion 120 and a magnet may be disposed next to the temperature sensor.

Referring to FIGS. 9A and 9B, in order to easily suspend the hanger-type cooking information providing device over the cooking container, the end 111 of the clip portion 110 may be bent outwards.

Figure 10:
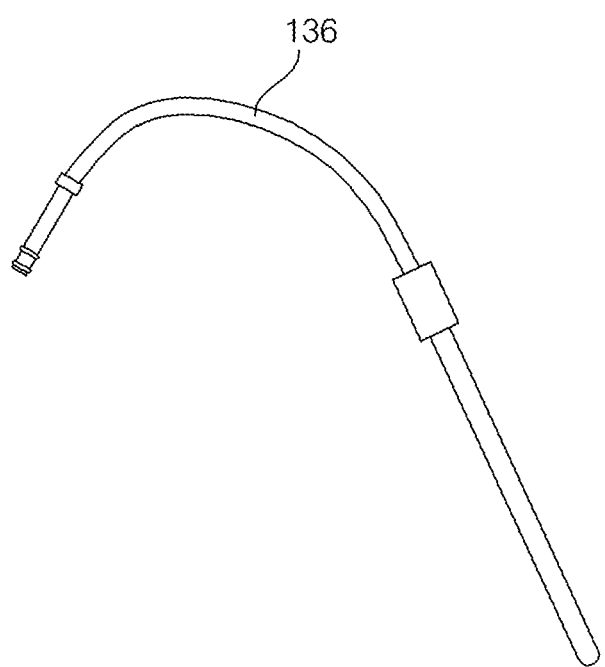
FIG. 10 is a diagram illustrating an example of a temperature reading probe of a hanger-type cooking information providing device according to an exemplary embodiment of the present invention.

FIG. 10 is a diagram illustrating an example of a temperature reading probe of a hanger-type cooking information providing device according to an exemplary embodiment of the present invention.

Figure 11:
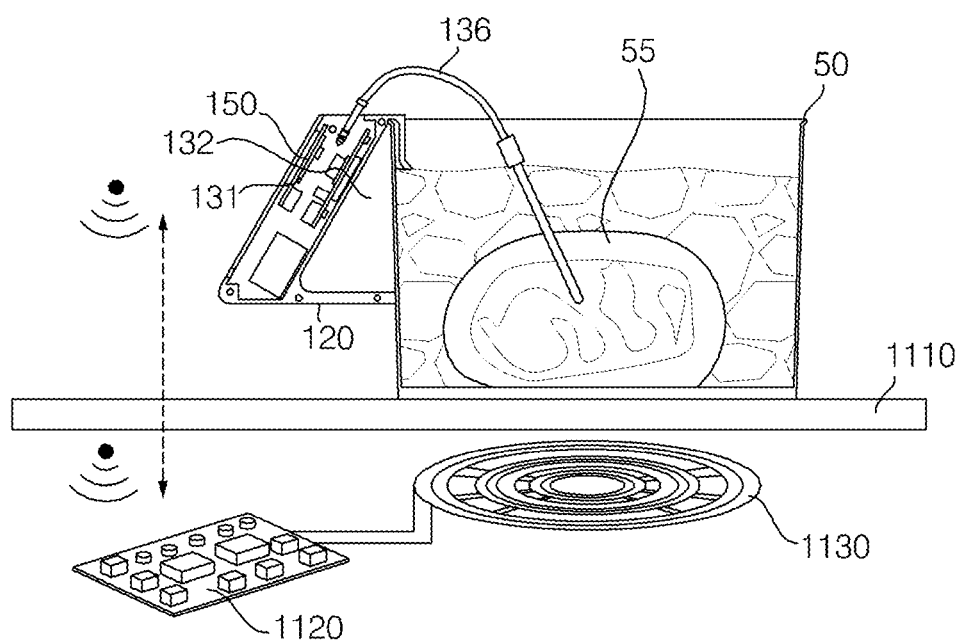
FIG. 11 is a diagram for explanation of an operation of a temperature reading probe of a hanger-type cooking information providing device according to an exemplary embodiment of the present invention.

FIG. 11 is a diagram for explanation of an operation of a temperature reading probe of a hanger-type cooking information providing device according to an exemplary embodiment of the present invention.

Referring to FIGS. 10 and 11, the hanger-type cooking information providing device according to an exemplary embodiment of the present invention may further include a temperature reading probe 136 that is inserted into a cooking target 55 to sense an internal temperature thereof.

The temperature reading probe 136 may be connected to the hanger-type cooking information providing device and may be used when in use only.

In this case, the main body portion 130 may include a probe jack 133 into which the temperature reading probe 136 is inserted for connection.

The user may insert the temperature reading probe 136 into the cooking target 55 and measure temperature of the cooking target 55.

When the cooking container 50 and the cooking target 55 are large, a temperature difference between a surface and an internal portion is large and, thus, it may be difficult to acquire desired temperature data using only temperature measured at a lateral surface of the cooking container 50.

Accordingly, according to the present invention, the internal temperature of the cooking target 55 may be recognized using the temperature reading probe 136 and, thus, more accurate and various types of temperature data may be used than when only temperature of the cooking container 50 is measured.

The hanger-type cooking information providing device according to an exemplary embodiment of the present invention may transmit cooking information including data sensed by sensors and/or secondary information obtained by processing sensed data to preset cooking equipment through the wireless communication module 132.

FIG. 11 is a diagram illustrating a case in which the preset cooking equipment is induction heating cooking equipment.

The cooking container 50 may be heated while being placed on an upper plate 1110 of a cooktop, for example, induction heating cooking equipment. When temperature sensed by a temperature sensor or the temperature reading probe 136 reaches a preset temperature, the wireless communication module 132 may transmit a control signal for powering off the induction heating cooking equipment or lowering heating intensity to the injection heating cooking equipment.

An inverter 1120 of the induction heating cooking equipment that receives the control signal may adjust power applied to a working coil 1130 to lower heating intensity.

According to an exemplary embodiment of the present invention, temperature information that is provided from the temperature reading probe 136 while the temperature reading probe 136 is inserted into the cooking target 55 may be shared with the inverter 1120 of the injection heating cooking equipment and power of a burner may be adjusted according to a food temperature to cook various foods.

For example, while water is contained in a pot, the temperature reading probe 136 may be installed in the pot.

When a user adjusts temperature setting to 100° C. through a display, a portable terminal, a manipulator, and so on, the hanger-type cooking information providing device may transmit information that is acquired from a temperature sensor during cooking, to the induction heating cooking equipment.

When water is boiled and temperature thereof reaches 100° C., the induction heating cooking equipment may be powered off.

When the user adjusts setting of temperature maintenance to 80 to 90° C., the hanger-type cooking information providing device may adjust power and continuously maintain a set temperature while transmitting information that is acquired from the temperature sensor during cooking to the induction heating cooking equipment.

During cooking of food with a large volume, when the temperature reading probe 136 is inserted into the food and, then, temperature setting is set to 70° C., if temperature in the food reaches 70° C., the hanger-type cooking information providing device may provide an alarm to the user and power off the induction heating cooking equipment.

Figure 12:
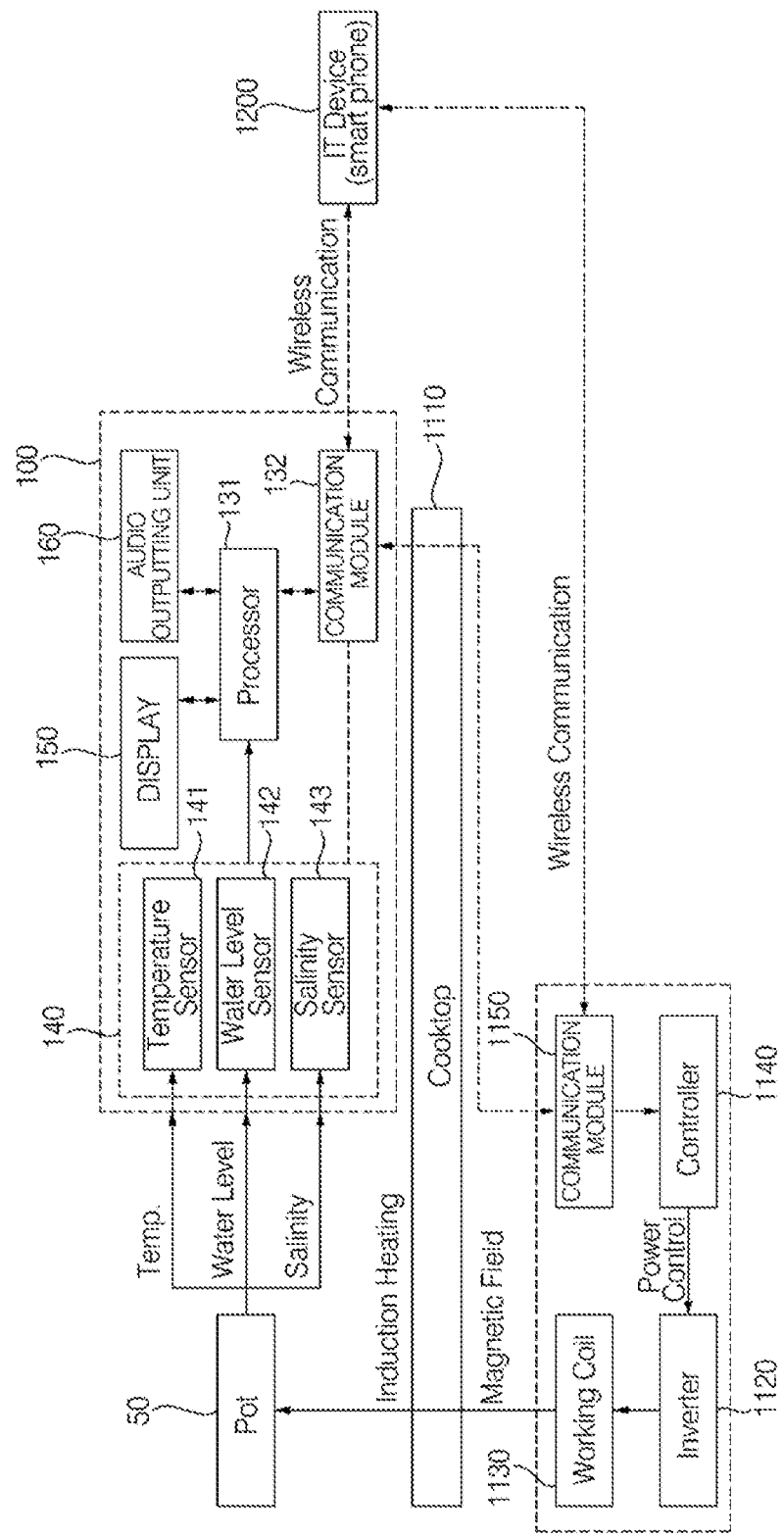
FIG. 12 is an internal block diagram of a hanger-type cooking information providing device according to an exemplary embodiment of the present invention.

FIG. 12 is an internal block diagram of a hanger-type cooking information providing device according to an exemplary embodiment of the present invention. In detail, FIG. 12 is a diagram for explanation of related operations to a portable terminal and induction heating cooking equipment along with respective blocks.

Referring to FIG. 12, the hanger-type cooking information providing device 100 according to an exemplary embodiment of the present invention may include the sensor unit 140 including the temperature sensor 141, the water level sensor 142, the salinity sensor 143, and so on, the processor 131, and the wireless communication module 132 that communicates with other devices such as an IT device 1200 such as a smart-phone and induction heating cooking equipment.

The cooking container 50 may be heated while being placed on the upper plate 1110 of a cooktop, for example, induction heating cooking equipment.

The hanger-type cooking information providing device 100 may output cooking information based on data sensed during cooking through the display 150 and the audio output unit 160.

The cooking information may include at least one of water level information sensed by the water level sensor, temperature information sensed by the temperature sensor, water boiling notification information, information on elapsed cooking time, and information on remaining cooking time.

The processor 131 may transmit the cooking information to the IT device 1200.

In some embodiments, the user may input setting of a desired temperature or the like through the display 150, the IT device 1200 such as a smart-phone and a separate manipulator.

A communication module 1150 of induction heating cooking equipment that receives cooking information including temperature data from the wireless communication module 132 may transmit received information to a controller 1140.

The controller 1140 of the induction heating cooking equipment may control power supplied to the working coil 1130 through the inverter 1120.

The hanger-type cooking information providing device 100 may directly transmit a control signal for adjusting temperature to the induction heating cooking equipment that is operatively associated with the hanger-type cooking information providing device 100.

In this case, the induction heating cooking equipment may perform a corresponding operation according to the received control signal.

The hanger-type cooking information providing device according to the present invention may collect information on time, temperature, water level, and salinity and transmit the collected information to a cooktop or other devices.

Accordingly, it may be possible to provide cooking information and to also adjust and maintain the collected information such as water temperature in a cooking container in conjunction with other devices.

It may be possible to provide secondary information by processing collected information. For example, information on time, temperature, water level, and salinity may be collected and secondary information such as display of notification and elapsed time of water boiling from a simple timer and water temperature may be provided.

It may be possible to suspend the hanger-type cooking information providing device according to the present invention alone and to place the hanger-type cooking information providing device close to a cooking container.

According to at least one of exemplary embodiments of the present invention, temperatures of a cooking container and a cooking target may be measured and the temperature information may be provided.

According to at least one of exemplary embodiments of the present invention, accuracy for measuring temperature of a cooking target may be enhanced.

According to at least one of exemplary embodiments of the present invention, various types of cooking information such as water level information, salinity information, and time information may be provided.

According to at least one of exemplary embodiments of the present invention, a hanger-type cooking information providing device may be advantageously and conveniently used and managed.

According to at least one of exemplary embodiments of the present invention, an operation may be operatively associated with cooking equipment based on acquired cooking information, thereby enhancing user convenience.

According to at least one of exemplary embodiments of the present invention, temperatures of a cooking container and a cooking target may be measured and temperature information be provided.

According to at least one of exemplary embodiments of the present invention, accuracy for measuring temperature of a cooking target may be enhanced.

According to at least one of exemplary embodiments of the present invention, various types of cooking information such as water level information, salinity information, and time information may be provided.

According to at least one of exemplary embodiments of the present invention, a hanger-type cooking information providing device may be advantageously and conveniently used and managed.

According to at least one of exemplary embodiments of the present invention, an operation may be operatively associated with cooking equipment based on acquired cooking information, thereby enhancing user convenience.

Other various advantages have been described or suggested according to the aforementioned exemplary embodiments of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hanger-type cooking information providing device, comprising:
   a clip portion comprising a water level sensor, and a distance sensor, and that is configured to be hung on a cooking container;
   a contact portion comprising a temperature sensor configured to contact one lateral surface of the cooking container and to measure temperature; and
   a main body portion comprising a wireless communication module configured to wirelessly transmit, to an external device, at least one of water level information sensed by the water level sensor, temperature information sensed by the temperature sensor, water boiling notification information, information on elapsed cooking time, and information on remaining cooking time, wherein a processor generates secondary temperature information based on a distance from one surface of the cooking container detected by the distance sensor and the temperature information sensed by the temperature sensor.

2. The hanger-type cooking information providing device according to claim 1, wherein the main body portion further comprises the processor configured to generate secondary information comprising at least one of the water boiling notification information, the information on elapsed cooking time, and the information on remaining cooking time based on primary data sensed by the water level sensor and the temperature sensor.

3. The hanger-type cooking information providing device according to claim 2, wherein the processor generates time information comprising at least one of cooking start time, elapsed cooking time, and current time and generates the secondary information based on the primary data and the time information.

4. The hanger-type cooking information providing device according to claim 1, further comprising a display configured to display information based on the water level information sensed by the water level sensor and the temperature information sensed by the temperature sensor.

5. The hanger-type cooking information providing device according to claim 4, wherein, when the water level information sensed by the water level sensor and the temperature information sensed by the temperature sensor satisfy a preset condition, the display displays notification information.

6. The hanger-type cooking information providing device according to claim 1, wherein an end of the clip portion is bent outwards.

7. The hanger-type cooking information providing device according to claim 1, wherein the clip portion further comprises a salinity sensor.

8. The hanger-type cooking information providing device according to claim 1, wherein the water level sensor detects current that flows through two metallic tips to detect a water level.

9. The hanger-type cooking information providing device according to claim 1, further comprising a temperature reading probe inserted into cooking target to sense internal temperature thereof.

10. The hanger-type cooking information providing device according to claim 9, wherein the main body portion comprises a probe jack into which the temperature reading probe is inserted for connection.

11. The hanger-type cooking information providing device according to claim 1, wherein the main body portion further comprises a hinge configured to adjust an angle of the contact portion at a lower end of the main body portion.

12. The hanger-type cooking information providing device according to claim 1, wherein an end of the contact portion comprises a magnet.

13. The hanger-type cooking information providing device according to claim 1, wherein the wireless communication module transmits, to a preset portable terminal, at least one of the water level information sensed by the water level sensor, the temperature information sensed by the temperature sensor, the water boiling notification information, the information on elapsed cooking time, and the information on remaining cooking time.

14. The hanger-type cooking information providing device according to claim 13, wherein, when the water level information sensed by the water level sensor and the temperature information sensed by the temperature sensor satisfy a preset condition, the wireless communication module transmits notification information to a preset portable terminal.

15. The hanger-type cooking information providing device according to claim 1, wherein the wireless communication module transmits, to preset cooking equipment, at least one of the water level information sensed by the water level sensor, the temperature information sensed by the temperature sensor, the water boiling notification information, the information on elapsed cooking time, and the information on remaining cooking time.

16. The hanger-type cooking information providing device according to claim 1, wherein the wireless communication module transmits a control signal for that allows preset cooking equipment to perform a predetermined operation based on the received information, to the preset cooking equipment.

17. The hanger-type cooking information providing device according to claim 16, wherein, when temperature sensed by the temperature sensor reaches preset temperature, the wireless communication module transmits a control signal for powering off the induction heating cooking equipment to the induction heating cooking equipment.

18. The hanger-type cooking information providing device according to claim 16, wherein, when temperature sensed by the temperature sensor reaches preset temperature, the wireless communication module transmits a control signal for performing a temperature maintenance function to the induction heating cooking equipment.

19. The hanger-type cooking information providing device according to claim 1, further comprising an audio outputting unit for outputting an alarm when the water level information sensed by the water level sensor and the temperature information sensed by the temperature sensor satisfy a preset condition.

* * * * *